UNITED STATES PATENT OFFICE.

FRIEDRICH BOEDECKER, OF BERLIN-MARIENDORF, GERMANY, ASSIGNOR TO THE FIRM OF J. D. RIEDEL AKTIENGESELLSCHAFT, OF BERLIN-BRITZ, GERMANY.

COMPOUNDS OF HEXAMETHYLENE-TETRAMIN.

1,133,916.      Specification of Letters Patent.      Patented Mar. 30, 1915.

No Drawing.      Application filed September 19, 1913.     Serial No. 790,761.

*To all whom it may concern:*

Be it known that I, Dr. FRIEDRICH BOEDECKER, subject of the German Emperor, residing at Berlin-Mariendorf, Germany, have invented certain new and useful Improvements Relating to Compounds of Hexamethylene-Tetramin, of which the following is a specification.

The specification of German Patent No. 240612 describes a sulfo-salicylate of hexamethylene-tetramin $$(CH_2)_6N_4 \cdot C_7H_6O_6S,$$

obtained by causing one part by weight of hexamethylene-tetramin to act on two parts by weight of sulfo-salicylic acid. The said specification also states, that sulfo-salicylic acid yields with more than one equivalent of hexamethylene-tetramin only products which crystallize badly and are difficult to purify. This assumption has proved to be erroneous; as a matter of fact the secondary salt $$C_7H_6O_6S \cdot 2(CH_2)_6N_4$$

may be obtained as well formed and durable crystals, if 2 equivalents of hexamethylene-tetramin are caused to act on one equivalent of sulfo-salicylic acid, preferably in alcoholic solution, and also by treating the primary sulfo-salicylate of hexamethylene-tetramin with a further equivalent of hexamethylene-tetramin.

Examples.

1. 7 kilograms of hexamethylene-tetramin are dissolved in 44 liters of boiling alcohol, and a solution of 5.5 kilos of sulfo-salicylic acid in 3.5 liters of hot alcohol is added. On cooling the secondary sulfo-salicylate of hexamethylene-tetramin separates out in the shape of large and well formed crystals, which are separated from the mother liquor and washed with some alcohol. The new salt dissolves very easily in water, but sparingly in alcohol, ether, acetone and chloroform. At a temperature approaching 180° C. it melts, while turning yellow. The analysis showed, that it contained 6.29 per cent. of sulfur, as compared with the theoretical quantity of 6.44 per cent.

2. 14 kilos of hexamethylene-tetramin, mixed with 36 kilos of primary sulfo-salicylate of hexamethylene-tetramin are dissolved in just sufficient water to form a solution, and the solution is filtered if necessary. An excess of alcohol is then added, thereby obtaining well-formed crystals, which are very easily soluble in water and melt at a temperature approaching 180°, while assuming a yellow color.

Owing to its easy solubility in water the secondary sulfo-salicylate of hexamethylene-tetramin is more suitable for rinsing purposes than the considerably less soluble primary salt. In consequence of its low acidity it also causes less irritation than the primary salt, but is very similar to the latter as regards its excellent effect on the diseased bladder. The secondary salt is especially free from the strongly laxative effect which the primary salt may produce on persons with a weakened or sensitive stomach.

What I claim is:—

1. The process for the manufacture of secondary sulfo-salicylate of hexamethylene-tetramin, which consists in causing hexamethylene-tetramin to act on sulfo-salicylic acid in the proportion of two molecules of the former to one molecule of the latter, substantially as described.

2. As a new product, secondary sulfo-salicylate of hexamethylene-tetramin having the composition $$C_7H_6O_6S \cdot 2(CH_2)_6N_4,$$

forming large well-formed crystals, very easily soluble in water, sparingly soluble in alcohol, ether, acetone and chloroform, and melting at a temperature approaching 180° C. while turning yellow, substantially as described.

In testimony whereof I have hereunto set my hand in presence of two subscribing witnesses.

DR. FRIEDRICH BOEDECKER.

Witnesses:
  WALTFER VOLK,
  MAX REICH.